US012609617B2

(12) United States Patent
Brambilla et al.

(10) Patent No.: US 12,609,617 B2
(45) Date of Patent: Apr. 21, 2026

(54) SWITCHING CONVERTER WITH VALLEY CURRENT DETECTION

(71) Applicant: STMicroelectronics International N.V., Geneva (CH)

(72) Inventors: Niccolò Brambilla, San Donato Milanese (IT); Valeria Bottarel, Novara (IT); Sandro Rossi, Pavia (IT); Alessandro Saccà, Milan (IT)

(73) Assignee: STMicroelectronics International N.V., Geneva (CH)

( * ) Notice: Subject to any disclaimer, the term of this patent is extended or adjusted under 35 U.S.C. 154(b) by 154 days.

(21) Appl. No.: 18/489,410

(22) Filed: Oct. 18, 2023

(65) Prior Publication Data

US 2025/0132673 A1     Apr. 24, 2025

(51) Int. Cl.
H02M 3/158     (2006.01)
H02M 1/00     (2006.01)

(52) U.S. Cl.
CPC ......... H02M 3/158 (2013.01); H02M 1/0009 (2021.05)

(58) Field of Classification Search
CPC ............. H02M 1/0009; H02M 1/0025; H02M 1/0003; H02M 3/158
See application file for complete search history.

(56) References Cited

U.S. PATENT DOCUMENTS

| | | | |
|---|---|---|---|
| 6,528,976 B1 * | 3/2003 | Lenk ................... | H02M 3/1588 |
| | | | 323/224 |
| 2012/0008238 A1 | 1/2012 | Thiele | |
| 2015/0137774 A1 | 5/2015 | Weis et al. | |
| 2019/0363625 A1 * | 11/2019 | Kirchner ............... | H02M 3/158 |
| 2022/0337236 A1 | 10/2022 | Gallo et al. | |
| 2023/0208280 A1 | 6/2023 | Groiss et al. | |
| 2023/0299674 A1 * | 9/2023 | Liu ......................... | H02M 3/06 |
| | | | 323/271 |

* cited by examiner

*Primary Examiner* — Alex Torres-Rivera
(74) *Attorney, Agent, or Firm* — Slater Matsil, LLP

(57)     ABSTRACT

A DC/DC converter including a low side and a high side is disclosed. The converter includes a first switching device being part of the low side, a low side current generator configured to generate a low side current flowing in the first switching device, a second switching device, a compensation resistor coupled in series to the second switching device, a valley current reference current generator configured to generate a valley current threshold current ($I_{valcl_{th}}$) flowing in the second switching device and in the compensation resistor for obtaining a first voltage value, and a comparator configured to compare the first voltage value and a reference voltage for generating an error signal as a function of the comparison, the error signal controlling a conductivity of the first switching device of the low side.

20 Claims, 6 Drawing Sheets

SWITCHING CONVERTER WITH VALLEY CURRENT DETECTION

TECHNICAL FIELD

The present disclosure generally relates to a switching converter with valley current detection, as well as to methods for controlling a switching converter.

BACKGROUND

As is known, DC-DC converters or switching converters are available which generate, from a DC input voltage, a DC output voltage to supply a load. The DC output voltage may be higher or lower than the DC input voltage. An output current of the DC-DC converter or switching converter varies with load impedance, and also may vary according to switching phase. For example, during switching phases, the output current may generally vary between a maximum peak current and a minimum valley current. DC-DC converters or switching converters may include circuitry which manages a peak current maximum threshold. DC-DC converters or switching converters may additionally or alternatively include circuitry which manages a valley current minimum threshold.

SUMMARY

One embodiment is a DC/DC converter including a low side and a high side. The converter includes a first switching device being part of the low side, a low side current generator configured to generate a low side current flowing in the first switching device, a second switching device, a compensation resistor coupled in series to the second switching device, a valley current reference current generator configured to generate a valley current threshold current ($I_{valcl_{th}}$) flowing in the second switching device and in the compensation resistor for obtaining a first voltage value, and a comparator configured to compare the first voltage value and a reference voltage for generating an error signal as a function of the comparison, the error signal controlling a conductivity of the first switching device of the low side.

Another embodiment is a converter circuit. The converter circuit includes a high side device coupled to a switch node and configured to selectively electrically couple the switch node to a high input voltage node according to a high side control signal, a low side device coupled to the switch node and configured to selectively electrically couple the switch node to a low input voltage node according to a low side control signal, an inductor coupled between the switch node and an output node of the converter circuit, a first switch and a compensation resistor coupled in series with the first switch, and a comparator configured to compare a reference voltage with a voltage equal to a sum of a voltage at the switch node and a voltage drop across the first switch and the compensation resistor, the comparator being configured to generate a valley current threshold signal based in part on an output of the comparator, the valley current threshold signal indicating that a valley current provided to the inductor falls below a threshold current limit. The converter circuit also includes a controller configured to generate, based in part on the valley current threshold signal, the high side control signal and the low side control signal.

Another embodiment is a method of controlling a DC/DC converter. The method includes generating a valley current threshold current to flow in a series connection including a first switching device and a compensation resistor, generating a first voltage value based on the valley current threshold current and a series resistance of the first switching device and the compensation resistor, with a comparator, comparing the first voltage value and a reference voltage to generate an error signal based on the comparison, and controlling a conductivity of a low side switching device of the DC/DC converter based in part on the error signal.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

Figure 1:
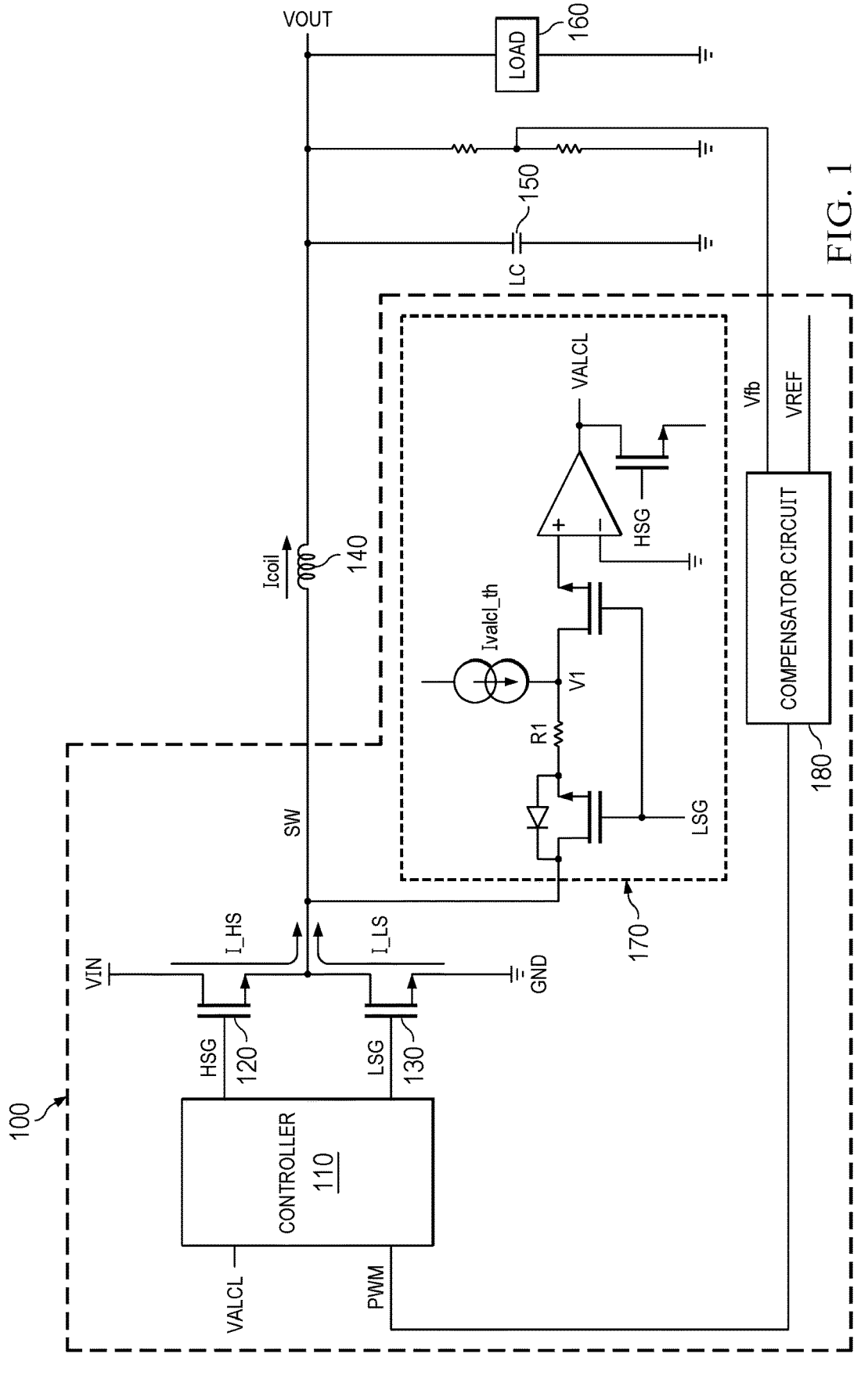
FIG. 1 shows a schematic circuit diagram of a converter circuit according to some embodiments.

Corresponding numerals and symbols in the different figures generally refer to corresponding parts unless otherwise indicated. The figures are drawn to illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

The embodiments discussed herein illustrate various aspects of DC-DC converter or switching converter technology which provides for accurate valley current detection and enforcement of a valley current minimum threshold. When an output current of a switching converter continues to increase, it reaches the maximum reliable value. The maximum level is the peak current limit, and when the output current reaches the peak current limit threshold the high side transistor is turned off. As a result, the output current decreases below the maximum reliable value.

In some embodiments, an on-time is constant and an off-time is controlled from cycle to cycle, and a valley current limit threshold may be detected. To detect the valley current limit threshold, a reference current may be forced into the low side transistor replica structure having properties similar or identical to the low side transistor of the switching converter. The goal is to trigger a comparator when the output current, as sensed by the replica structure, goes below the valley current limit threshold. Once triggered, the comparator generates a signal which allows the controller 110 of the DC-DC converter to turn on the high side transistor. In some embodiments, the valley of the inductor current (or the low side transistor current) can also be used to control the current limit of the DC-DC converter. For example, if the output current does not fall below the valley current threshold, before the next clock cycle of the PWM signal, the high side transistor is not turned on. The valley current limit control may keep the on-time constant.

FIG. 1 shows a schematic circuit diagram of a converter circuit 100 connected to load 160 according to some embodiments. Converter circuit 100 includes controller 110, high side device 120, low side device 130, compensator circuit 180, and valley current threshold detector circuit 170. Converter circuit 100 is configured to receive a target reference voltage at node VREF, a high reference voltage at node VIN, and a low reference voltage at node GND. In response to the received signals, converter circuit 100 is configured to generate an output voltage at output node VOUT for load 160. For example, the output voltage may be greater than the low reference voltage and less than the high reference voltage. Converter circuit 100 generates the output voltage by controlling the low side control signal at node LSG and the high side control signal at node HSG to minimize a difference between the feedback voltage at node Vfb and the reference voltage.

Compensator circuit 180 receives the feedback voltage at node Vfb and the target reference voltage at node VREF. In response to a difference between the feedback voltage and the reference voltage, the compensator circuit 180 is configured to generate a PWM signal at node PWM.

To generate the output voltage, the controller 110 causes the high side device 120 and the low side device 130 to be alternatingly conductive according to the PWM signal. In general, while the controller 110 causes the high side device 120 to be conductive, the controller 110 causes the low side device 130 to the nonconductive. Similarly, while the controller 110 causes the low side device 130 to be conductive, the controller 110 causes the high side device 120 to be nonconductive. In some embodiments, at least while the high side device 120 is conductive, the remainder of the converter circuit 100 may be modelled as and/or considered a high side current generator which generates a high side current flowing through the high side device 120. Similarly, in some embodiments, at least while the low side device 130 is conductive, the remainder of the converter circuit 100 may be modelled as and/or considered a low side current generator which generates a low side current flowing through the low side device 130.

In some embodiments, in response to the difference between the feedback voltage and the reference voltage, the compensator circuit 180 is configured to adjust the PWM signal to so that the feedback voltage changes to reduce the difference. For example, the compensator circuit 180 may be configured to increase a high time of the PWM signal in response to the feedback voltage being less than the reference voltage. Similarly, the compensator circuit 180 may be configured to decrease a high time of the PWM signal in response to the feedback voltage being greater than the reference voltage.

In response to the adjusted PWM signal, the controller 110 modifies or controls a ratio of an on-time duration of the high side device 120 to an on-time duration of the low side device 130. For example, in response to the adjusted PWM signal, the controller may be configured to increase the ratio, for example, such that during a particular cycle, the high side device is on for a greater on-time duration, and, in some embodiments, the low side device is on for a reduced on-time duration. Similarly, in response to the adjusted PWM signal, the controller 110 may be configured to decrease the ratio, for example, such that during a particular cycle, the high side device is on for a reduced on-time duration, and, in some embodiments, the low side device is on for an increased on-time duration. Accordingly, the controller 110 modifies or controls the ratio of on-time durations such that the reference voltage is equal or substantially equal to the reference voltage while the converter circuit 100 supplies a load current to the load through a filter including inductor 140 and load capacitor 150.

Converter circuit 100 also includes valley current threshold detector circuit 170, which is configured to generate a valley current threshold signal at node VALCL, where the valley current threshold signal indicates whether a valley current provided to inductor 140 falls below a threshold limit. The valley current threshold signal is then received at the controller 180 through the node VALCL.

As discussed in further detail below, the valley current threshold detector circuit 170 is designed and manufactured to generate the valley current threshold signal in response to the voltage at the switch node SW increasing enough to indicate that the current through the low side device 130 is less than the valley current minimum threshold current limit. In addition, as discussed in further detail below, the valley current threshold detector circuit 170 is designed and manufactured to replicate the voltage drop across the low side device 130 when the low side device 130 conducts a current equal to the valley current minimum threshold current limit using a replica device having a nominal resistance designed and manufactured to match the nominal resistance of the low side device 130.

In some embodiments, the resistance of the replica device and the resistance of the low side device 130 are different by less than any of about 0.05%, about 0.1%, about 0.2%, about 0.3%, about 0.4%, about 0.5%, about 1%, about 2%, about 3%, about 4%, about 5%, about 10%, about 15%, about 20%, and about 25%. For example, the resistance of the replica device and the resistance of the low side device 130 may be different by between 0% and about 0.5%, or any of the other limits listed above. In some embodiments, the resistance of the replica device and the resistance of the low side device 130 are different by less than any of about 0.05%, about 0.1%, about 0.2%, about 0.3%, about 0.4%, about 0.5%, about 1%, about 2%, about 3%, about 4%, about 5%, about 10%, about 15%, about 20%, and about 25% while operating the converter in an ambient temperature anywhere between 40° C. to 150° C.

In some embodiments, the voltage drop across the replica device and the voltage drop across the low side device 130 are different by less than any of about 0.05%, about 0.1%, about 0.2%, about 0.3%, about 0.4%, about 0.5%, about 1%, about 2%, about 3%, about 4%, about 5%, about 10%, about 15%, about 20%, and about 25%. For example, the voltage drop across the replica device and the voltage drop across the low side device 130 may be different by between 0% and about 0.5%, or any of the other limits listed above. In some embodiments, the voltage drop across the replica device and the voltage drop across the low side device 130 are different by less than any of 0.05%, about 0.1%, about 0.2%, about 0.3%, about 0.4%, about 0.5%, about 1%, about 2%, about 3%, about 4%, about 5%, about 10%, about 15%, about 20%, and about 25% while operating the converter in an ambient temperature anywhere between 40° C. to 150° C.

Controller 110 receives the valley current threshold signal and controls the on/off cycling of the high side device 120 and the low side device 130 according to control principles, for example, discussed in embodiments elsewhere herein. As a result, in some embodiments, the conductivity of the high side device 120 and the low side device 130 are controlled such that the current to inductor 140 has a minimum (a valley) which is less a maximum threshold limit.

In some embodiments, the valley current limit is used to prevent the average output current from exceeding a maximum threshold current. By controlling the valley current, the converter can avoid exceeding the peak current limit during the ON time when the high side switch is conductive. The use of both peak current limit and valley current limit controls provides redundancy and makes the system more robust.

Figure 2:
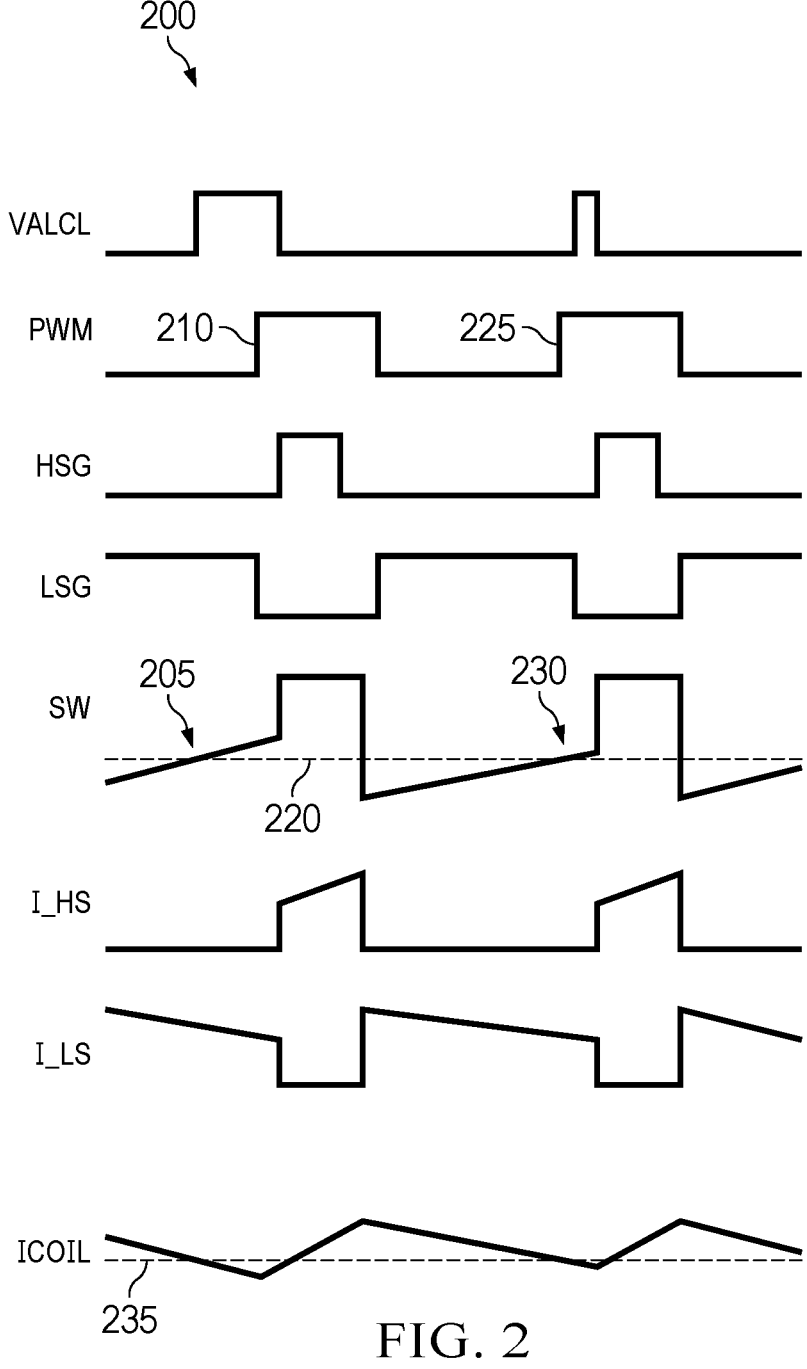
FIG. 2 shows a schematic waveform diagram illustrating functionality of the converter circuit shown in FIG. 1 according to some embodiments.

FIG. 2 shows a schematic waveform diagram 200 illustrating functionality of the converter circuit 100 shown in FIG. 1 according to some embodiments. The illustrated schematic waveforms show a particular embodiment, and other waveforms may be used to implement the inventive aspects discussed herein.

At crossing 205, the inductor current Icoil decreases below the valley current threshold 235, as indicated by the switch node voltage increasing above the valley current threshold limit 220. In response, valley current threshold detector circuit 170 generates a corresponding valley current threshold signal at node VALCL. The valley current threshold signal provides an indication that the valley current of the converter circuit 100 has dropped below the target threshold limit.

In response to the rising edge 210 of the PWM signal at node PWM, because the valley current threshold signal indicates that the valley current of the converter circuit 100 has dropped below the target threshold limit, the controller 110 causes the low side control signal at node LSG to turn off low side device 130. In response to low side device 130 turning off, the low side current I_LS decreases.

In the illustrated embodiment, in response to the rising edge 210 of the PWM signal at node PWM, the controller 110 causes the side control signal at node HSG to turn on high side device 120 after a delay, for example, to ensure that the high side device 120 and the low side device 130 are not simultaneously on. In response to turning on, the valley current threshold signal is pulled to ground, the high side current I_HS increases, the inductor current Icoil increases, and the switch node voltage at switch node SW increases to or toward the high reference voltage at node VIN.

In the illustrated embodiment, after the high side device 120 has been turned on, controller 110 causes the side control signal at node HSG to turn off high side device 120 after a delay, for example, to cause the high side device 120 to be on for an on-time duration corresponding with a target ratio of high side device 120 on-time to low side device 130 on-time for the cycle. In some embodiments, the on-time duration is constant from cycle to cycle of the PWM signal. In response to side device 120 turning off, the high side current I_HS decreases.

In the illustrated embodiment, after the high side device 120 has been turned off, controller 110 causes the side control signal at node LSG to turn on low side device 130 after a delay, for example, to ensure that the high side device 120 and the low side device 130 are not simultaneously on. In response to side device 130 turning on, the low side current I_LS increases, the switch node voltage at switch node SW decreases below the output voltage at output node VOUT to or toward the low reference voltage at node GND, and the inductor current Icoil begins to decrease.

Because the inductor current Icoil decreases, the low side current I_LS correspondingly decreases, and the switch node voltage correspondingly increases, and, at 230, because the inductor current Icoil decreases below the valley current threshold 235, the switch node voltage becomes greater than the valley current threshold limit 220.

In response to the rising edge 225 of the PWM signal at node PWM, because the valley current threshold signal indicates that the valley current of the converter circuit 100 has not dropped below the target threshold limit, the controller 110 does not cause the low side control signal at node LSG to turn off low side device 130.

In response to the inductor current Icoil decreasing below the valley current threshold 235, and switch node voltage increasing above the valley current threshold limit 220, valley current threshold detector circuit 170 generates a corresponding valley current threshold signal at node VALCL. In this situation, the valley current threshold signal provides an indication that the valley current of the converter circuit 100 has dropped below a target threshold limit, and in response to the valley current threshold signal, because the PWM signal is already high, controller 110 causes the low side control signal at node LSG to turn off low side device 130. In response to low side device 130 turning off, the low side current I_LS decreases.

In the illustrated embodiment, in response to the valley current threshold signal, the controller 110 causes the side control signal at node HSG to turn on high side device 120 after a delay, for example, to ensure that the high side device 120 and the low side device 130 are not simultaneously on.

In response to turning on, the valley current threshold signal is clamped to the node GND, the high side current I_HS increases, the inductor current Icoil increases, and the switch node voltage at switch node SW increases.

In the illustrated embodiment, after the high side device 120 has been turned on, controller 110 causes the side control signal at node HSG to turn off high side device 120 after a delay, for example, to cause the high side device 120 to be on for an on-time duration corresponding with a target ratio of high side device 120 on-time to low side device 130 and the low side device 130 on-time for the cycle. In response to side device 120 turning off, the high side current I_HS decreases.

In the illustrated embodiment, after the high side device 120 has been turned off, controller 110 causes the side control signal at node LSG to turn on low side device 130 after a delay, for example, to ensure that the high side device 120 and the low side device 130 are not simultaneously on. In response to side device 130 turning on, the low side current I_LS increases, the switch node voltage at switch node SW decreases below the output voltage at output node VOUT, and the inductor current Icoil begins to decrease.

Accordingly, in the illustrated embodiment, each cycle of the PWM signal, the inductor current Icoil decreases to be less than the valley current threshold 235, as indicated by the switch node voltage increasing above the valley current threshold limit 220. If the PWM signal is high when the valley current threshold indicates that the inductor current has decreased to be less than the valley current threshold, the controller 110 causes the low side control signal at node LSG to turn off low side device 130 in response to the valley current threshold signal. If the PWM signal is low when the valley current threshold indicates that the inductor current has decreased to be less than the valley current threshold, the controller 110 causes the low side control signal at node LSG to turn off low side device 130 in response to the PWM signal going high.

Figure 3:
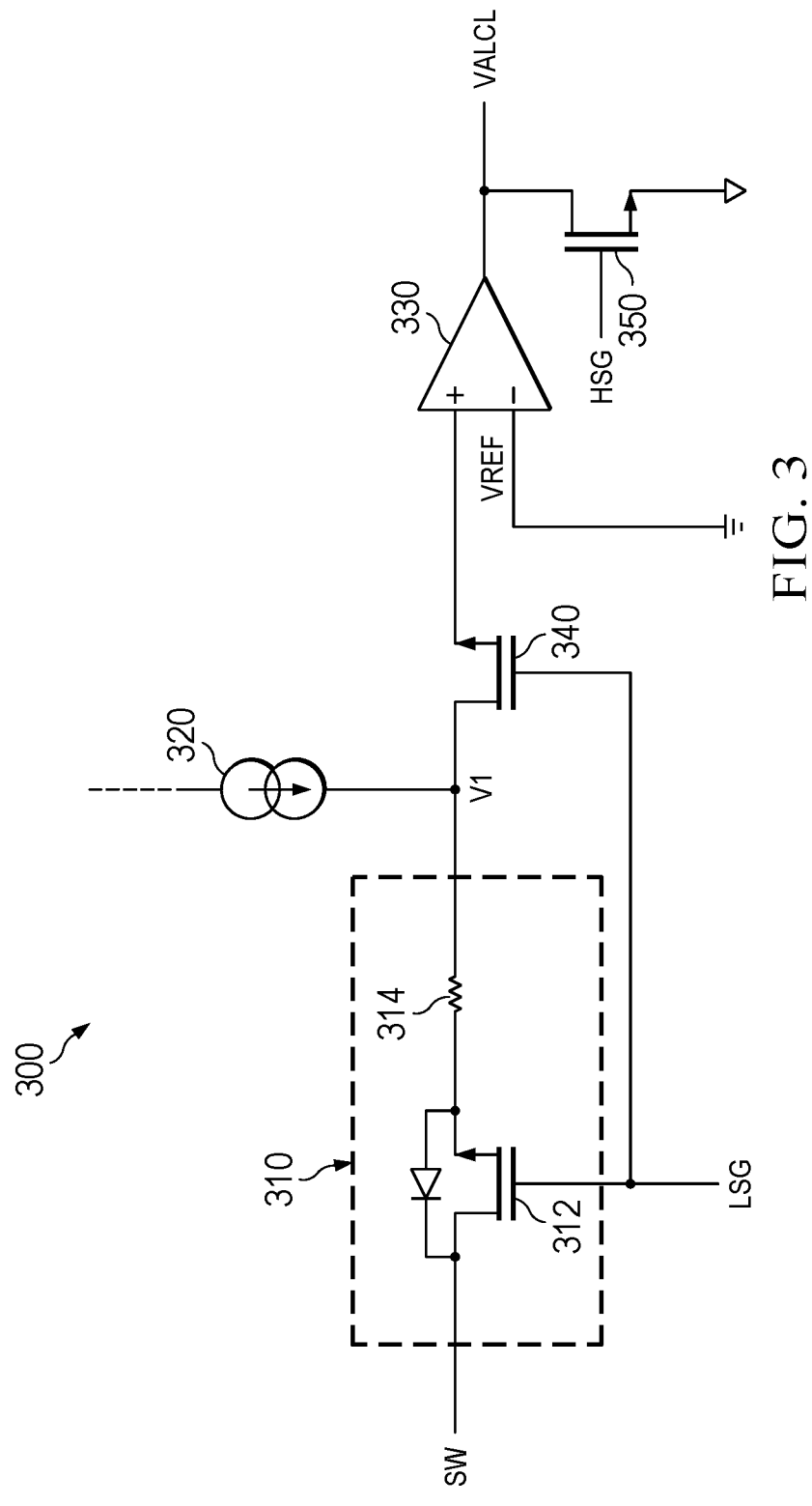
FIG. 3 shows a schematic circuit diagram of a valley current threshold detector circuit according to some embodiments.

FIG. 3 shows a schematic circuit diagram of a valley current threshold detector circuit 300 according to some embodiments. Valley current threshold detector circuit 300 may be used as valley current threshold detector circuit 170 of a converter, such as converter circuit 100. Valley current threshold detector circuit 300 includes replica device 310 comprising replica switch 312 and compensation resistor 314, valley current reference current generator 320, and comparator 330.

The following node equations describe the electrical functionality of valley current threshold detector circuit 300 as used in converter circuit 100:

$$v_{SW} = -ILS \cdot \alpha \cdot \frac{R'_{ds,LS}}{w_{LS}},$$

$$v_1 - v_{SW} = I_{valcl_{th}} \cdot \beta \cdot \frac{R'_{ds,replica}}{w_{replica}} + I_{valcl_{th}} \cdot R_1, \text{ and}$$

$$v_1 = -ILS \cdot \alpha \cdot \frac{R'_{ds,LS}}{w_{LS}} + I_{valcl_{th}} \cdot \beta \cdot \frac{R'_{ds,replica}}{w_{replica}} + I_{valcl_{th}} \cdot R_1,$$

where $v_{SW}$ is the voltage at the switch node SW, ILS is the current in the low side device 130, $\alpha$ is a percentage of the current of low side device 130 which is flowing through the channel of low side device 130, $R'_{ds,LS}$ is a drain to source resistance of the low side device 130, $w_{LS}$ is a channel width of the low side device 130, $v_1$ is the voltage at node V1, $I_{valcl_{th}}$ is the reference current of valley current reference current generator 320, $\beta$ is a percentage of current flowing through the replica device 310 which is flowing through the channel of replica switch 312, $R'_{ds,replica}$ is a drain to source resistance of replica switch 312, $w_{replica}$ is a channel width of replica switch 312, and $R_1$ is the resistance of compensation resistor 314.

At the comparator threshold condition, ILS is equal to the valley current threshold ILS_VCL and $v_1 = 0$, and:

$$-ILS\_VCL \cdot \alpha \cdot \frac{R'_{ds,Ls}}{w_{Ls}} + I_{valcl_{th}} \cdot \beta \cdot \frac{R'_{ds,replica}}{w_{replica}} + I_{valcl_{th}} \cdot R_1 = 0.$$

Therefore, $$I_{valcl_{th}} = ILS\_VCL \cdot \frac{\alpha \cdot R'_{ds,Ls}}{\left(\beta \cdot \frac{R'_{ds,replica}}{w_{replica}} + R_1\right) \cdot w_{replica}} \cdot \frac{w_{replica}}{w_{LS}}.$$

Valley current threshold detector circuit 300 is designed and manufactured such that $$\frac{\alpha \cdot R'_{ds,Ls}}{\left(\beta \cdot \frac{R'_{ds,repl}}{w_{replica}} + R_1\right) \cdot w_{replica}} \approx 1.$$

Accordingly, $$I_{valcl_{th}} \approx ILS\_VCL \cdot \frac{w_{replica}}{w_{LS}}, \text{ and}$$

$$R_1 \approx \alpha \cdot \frac{R'_{ds,repl}}{w_{replica}} - \beta \cdot \frac{R'_{ds,repl}}{w_{replica}}.$$

For example, replica device 310 may be designed and manufactured to have a nominal impedance or resistance that matches the nominal impedance or resistance of the low side device of the converter, such that the impedance or resistance of the replica device 310 is a first factor value times the impedance or resistance of the low side device of the converter having valley current threshold detector circuit 300, at least at room temperature (T=27° C.). For example, when valley current threshold detector circuit 300 is used in an embodiment of converter circuit 100, replica device 310 may be designed and manufactured with an impedance or resistance having a factor value equal to, for example, 5000 times the impedance of low side device 130, at least at room temperature (T=27° C.), for example because of having a width ⅕₀₀₀ the width of the low side device 130 Other fraction relationships may be used.

As understood by those of skill in the art, conventional valley current detector circuits lack a resistor corresponding with compensation resistor 314. As a result, in some circumstances, such as, for example, at high temperature, the impedance or resistance of conventional valley current detector circuits would not match the impedance or resistance of the low side device. As consequence, when the low-side current is equal to the target valley current limit, the voltage v1 would not be equal to zero (i.e., threshold condition). This is the case at least partly because the body diode area of the replica device and the low side device do not scale the same as channel on resistance. Consequently, the ratio of the current conducted by the body-drain diode of the replica device to the current conducted by the body-drain diode of the low side device is different than the ratio of the effective widths of the replica device and the low side device.

In some embodiments, the resistance of the compensation resistor 314 monotonically increases with increasing temperature of the compensation resistor 314. In some embodiments, the resistance value of the replica resistance is between at least one of: 30Ω and 100Ω, 50Ω and 90Ω, and 60Ω and 80Ω, for the temperature T<80° C. and is between at least one of 60Ω and 200Ω, 60Ω and 150Ω, and 70Ω and 140Ω for the temperature T>80° C.

In some embodiments, the series resistance of replica switch 312 and compensation resistor 314 matches the resistance of the low side device because the compensation resistor 314 has a voltage drop which affects the resistance of replica switch 312. For example, the voltage drop of compensation resistor 314 causes the drain to source voltage of replica switch 312 to be reduced. Consequently, the forward bias voltage of the body diode of replica switch 312 is reduced and the effective resistance of the body diode is increased. As a result, replica switch 312 either does not turn on or turns on with less absorption current. In some embodiments, the voltage drop across the compensation resistor 314 is between about 30 mV and about 70 mV.

In some embodiments, the resistance of the compensation resistor 314, and at least one of the resistance of the low side device and the resistance of the compensation resistor 314 are temperature dependent with substantially a same temperature coefficient.

Valley current reference current generator 320 may be designed and manufactured to source a current having a second factor value of the valley current minimum threshold current limit, at least at room temperature (T=27° C.) when the low side device conducts a current equal to the valley current minimum threshold current limit. Accordingly, when valley current threshold detector circuit 300 is used in an embodiment of converter circuit 100, valley current reference current generator 320 may be designed and manufactured to source a current having a factor value equal to ⅕₀₀₀ of the valley current minimum threshold current limit, at least when the low side device conducts a current equal to the valley current minimum threshold current limit. Valley current reference current generator circuit 320 may be designed and manufactured to source a current having a factor value equal to a fraction of the valley current minimum threshold current limit which is determined based on the width ratio between low-side device and the replica switch 310.

Because, at least when the low side device conducts a current equal to the valley current minimum threshold current limit, the first and second factor values have an inverse relation, the voltage drop across the replica device 310 may be about equal to or substantially equal to or effectively equal to the voltage drop across the low side device when the low side device conducts a current having a value equal to the valley current minimum threshold current limit.

In some embodiments, the first and second factor values are different by less than any of about 0.5%, about 1%, about 2%, about 3%, about 4%, about 5%, about 10%, about 15%, about 20%, and about 25%. For example, the first and second factor values are different by between 0% and about 0.5%, or any of the other limits listed above. In some embodiments, the first and second factor values are different by less than any of about 0.5%, about 1%, about 2%, about 3%, about 4%, about 5%, about 10%, about 15%, about 20%, and about 25% while operating the converter in an ambient temperature anywhere between −40° C. to 150° C.

Therefore, when valley current threshold detector circuit 300 is used in an embodiment of converter circuit 100, when the switch node voltage increases to become greater than a switch node valley current threshold limit, such as valley current threshold limit 220, the voltage at the positive input of comparator 330 increases to be greater than the voltage at the negative input of comparator 330. As a result, the comparator 330 generates a valley current threshold signal at node VALCL, where the valley current threshold signal indicates that the voltage of the switch node has increased to become greater than the switch node valley current threshold limit, which may conditionally serve as an indication that the valley current of the converter has decreased below the valley current minimum threshold current limit.

In some embodiments, compensation resistor 314 may be, for example, a designed resistive element, such as a physical resistor, as opposed to a parasitic resistance, for example, inherent to designed components or wiring. In some embodiments, compensation resistor 314 comprises a resistive material, such as polysilicon, doped silicon, a doped semiconductor, or other materials used to form resistors. In some embodiments, compensation resistor 314 comprises a switch or a transistor, such as an MOS transistor.

Switch 340 is used to disconnect input of the comparator from the replica device 310 when the low side control signal at node LSG is low. Switch 350 is used to clamp the valley current threshold signal at node VALCL to ground when the high side control signal at node HSG is high.

Figure 4:
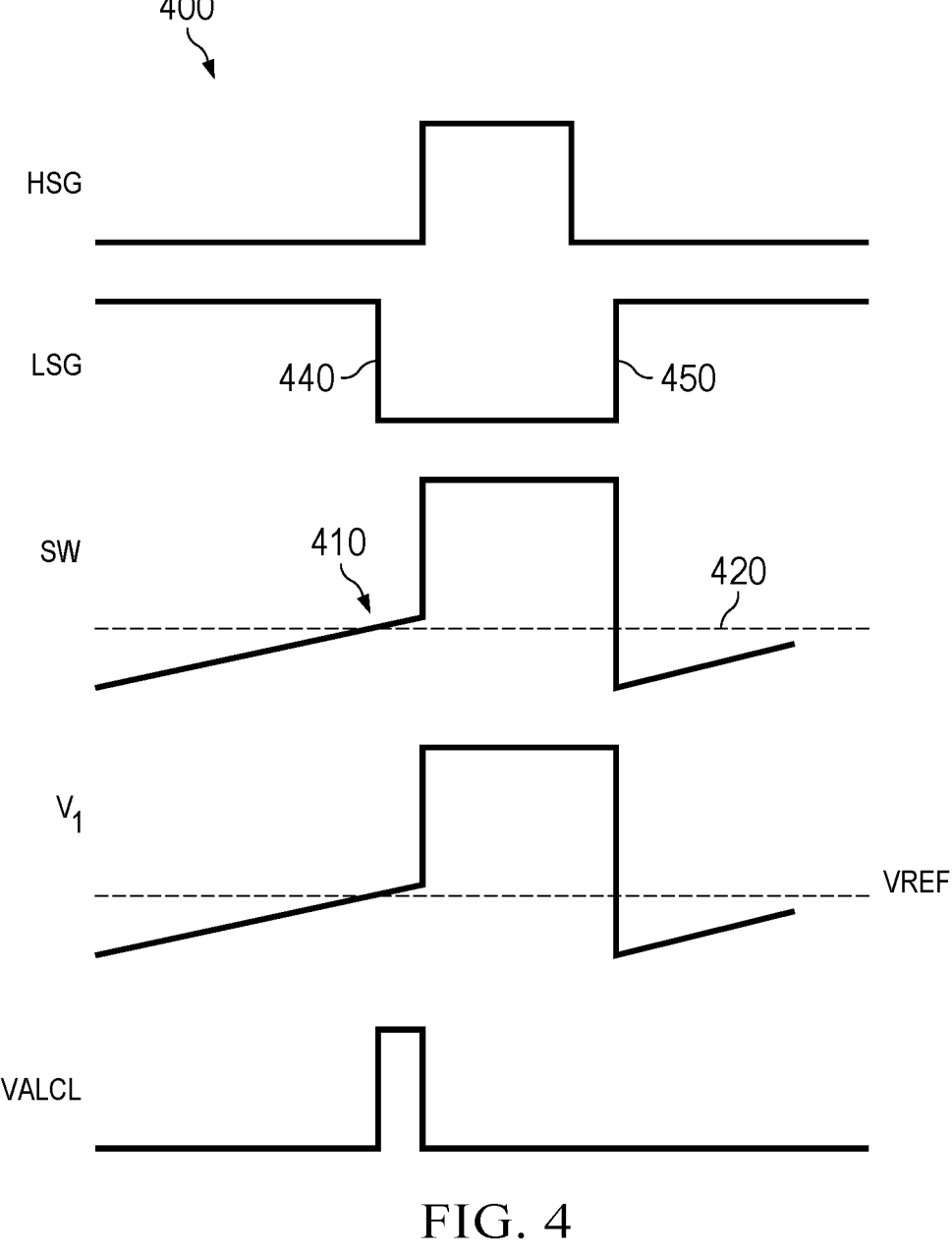
FIG. 4 shows a schematic waveform diagram illustrating functionality of the valley current threshold detector circuit shown in FIG. 3 according to some embodiments.

FIG. 4 shows a schematic waveform diagram 400 illustrating functionality of the valley current threshold detector circuit 300 shown in FIG. 3 according to some embodiments. The illustrated schematic waveforms show a particular embodiment, and other waveforms may be used to implement the inventive aspects discussed herein.

At crossing 410, the switch node voltage at node SW increases above the valley current threshold limit 420, and the voltage at node V1 increases above the reference voltage at node Vref. In response, comparator 330 generates a corresponding valley current threshold signal at node VALCL. The valley current threshold signal provides an indication that the valley current of the converter circuit has dropped below the target threshold limit.

In response to a PWM signal of the converter being high and the valley current threshold signal being high, a controller of the converter circuit causes the low side control signal at node LSG to turn off the low side device of the converter circuit and causes the side control signal at node HSG to turn on the high side device of the converter after a delay, for example, to ensure that the high side device and the low side device are not simultaneously on. In response to the turning on, the valley current threshold signal is pulled to ground, and the switch node voltage at switch node SW increases, and the voltage at node V1 increases.

After the high side device has been turned on, the controller causes the side control signal at node HSG to turn off the high side device after a delay, for example, to cause the high side device to be on for an on-time duration corresponding with a target ratio of high side device on-time to low side device on-time for the cycle. After the high side device has been turned off, at 450, the controller causes the side control signal at node LSG to turn on low side device after a delay, for example, to ensure that the high side device and the low side device are not simultaneously on. In response to side device turning on, the switch node voltage at switch node SW decreases below the output voltage at output node VOUT, and the voltage at node V1 decreases below the reference voltage.

In response to the rising edge of a PWM signal of the converter using the valley current threshold detector circuit, at 410, a controller of the converter causes the low side control signal at node LSG to turn off the low side device of the converter and to turn off replica switch 312 of valley current threshold detector circuit 300. In response to low side device turning off, the low side current of the converter decreases.

Accordingly, in the illustrated embodiment, valley current threshold detector circuit 300 functions similarly or identically as valley current threshold detector circuit 170 described above with reference to FIGS. 1 and 2.

Figure 5:
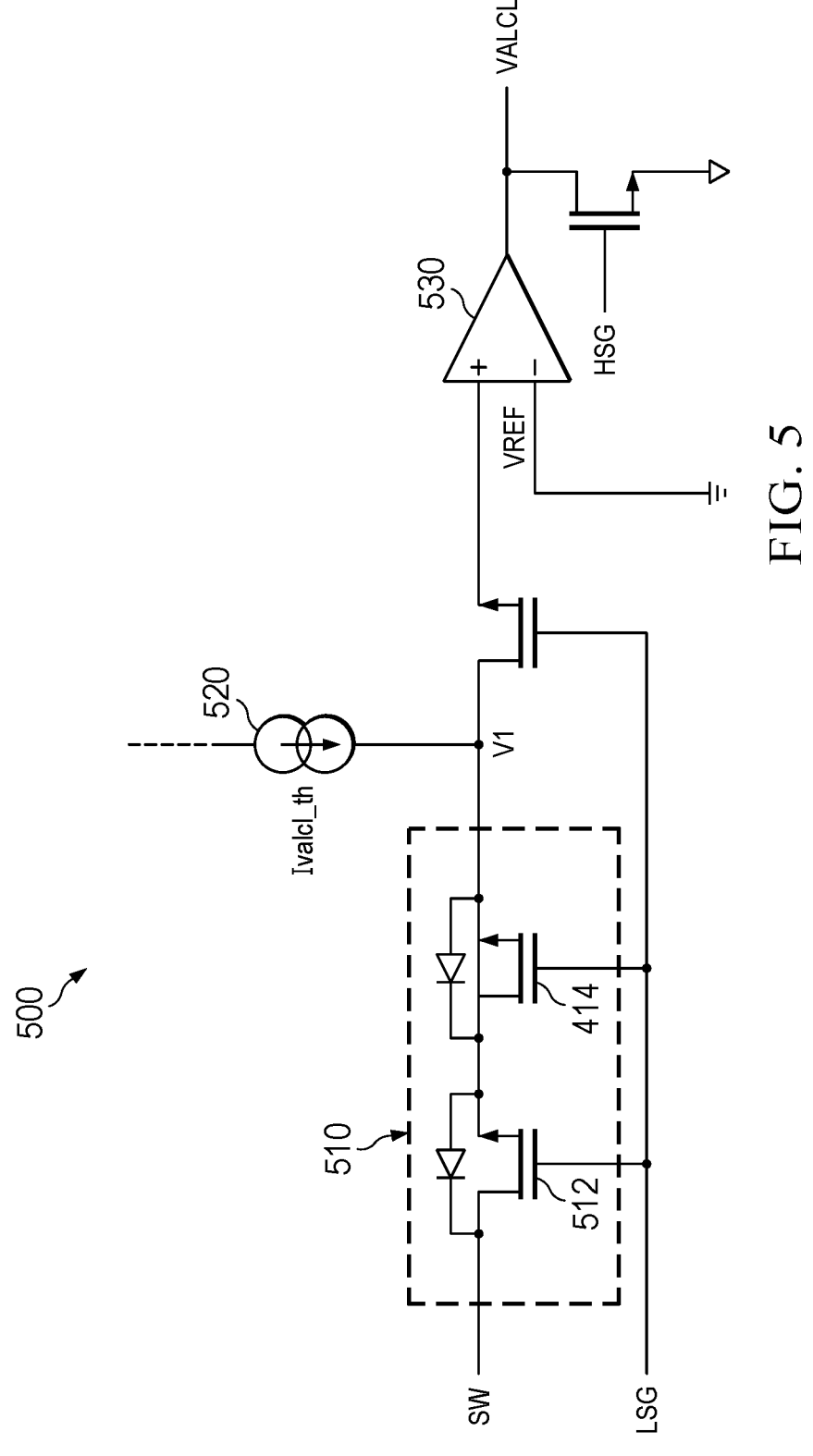
FIG. 5 shows a schematic circuit diagram of a valley current threshold detector circuit according to some embodiments.

FIG. 5 shows a schematic circuit diagram of a valley current threshold detector circuit 500 according to some embodiments. Valley current threshold detector circuit 500 may be used as valley current threshold detector circuit 170 of a converter, such as converter circuit 100. Valley current threshold detector circuit 500 includes replica device 510 comprising replica switch 512 and compensation resistance switch 514, valley current reference current generator 520, and comparator 530. Compensation resistance switch 514 is a specific embodiment of the previously discussed compensation resistor 314 of FIG. 3.

Valley current threshold detector circuit 500 may be and/or behave similarly or identically to that described above with reference to valley current threshold detector circuit 300, where corresponding elements have similar or identical characteristics and functionality.

In contrast to the corresponding elements of some embodiments of valley current threshold detector circuit 300, replica switch 512 and compensation resistance switch 514 may be of identical structure, although they may be different sizes. For example, replica switch 512 and compensation resistance switch 514 may be similarly formed semiconductor MOSFET switches. Accordingly, the replica switch may have a first channel and a first diode having a first activation voltage, and the compensation resistance switch 514 may have a second channel and a second diode having a second activation voltage. In addition, when used in a converter circuit, replica switch 512 and compensation resistance switch 514 may be of a structure identical to that of the low side device of the converter. Accordingly, in some converters, the low side device, the replica switch 512, and the compensation resistance switch 514 may be similarly formed as semiconductor MOSFET switches.

When the low side device, the replica switch 512, and the compensation resistance switch 514 have similar or identical structures, the resistance or impedance of the combination of the replica switch 512 and the compensation resistance switch 514 better match the resistance or impedance of the low side device over various process, temperature, voltage, current, and other operating conditions than when non-identical structures are used. Similarly, when the low side device, the replica switch 512, and the compensation resistance switch 514 have similar or identical structures, the voltage drop across the combination of the replica switch 512 and the compensation resistance switch 514 better matches the voltage drop across the low side device over various process, temperature, voltage, current, and other operating conditions than when non-identical structures are used.

In some embodiments, the resistance of the compensation resistance switch 514 monotonically increases with increasing temperature of the compensation resistance switch 514. In some embodiments, the resistance value of the compensation resistance switch 514 is between at least one of: 30Ω and 100Ω, 50Ω and 90Ω, and 60Ω and 80Ω, for the temperature T<80° C. and is between at least one of 60Ω and 200Ω, 60Ω and 150Ω, and 70Ω and 140Ω for the temperature T>80° C.

In some embodiments, the resistance of the compensation resistance switch 514 and the resistance of the low side device are temperature dependent with substantially a same slope of resistance divided by temperature for the temperature less than 80° C. In some embodiments, the resistance of the compensation resistance switch 514 and the resistance of the compensation resistor 314 are temperature dependent with substantially a same temperature coefficient.

Figure 6:
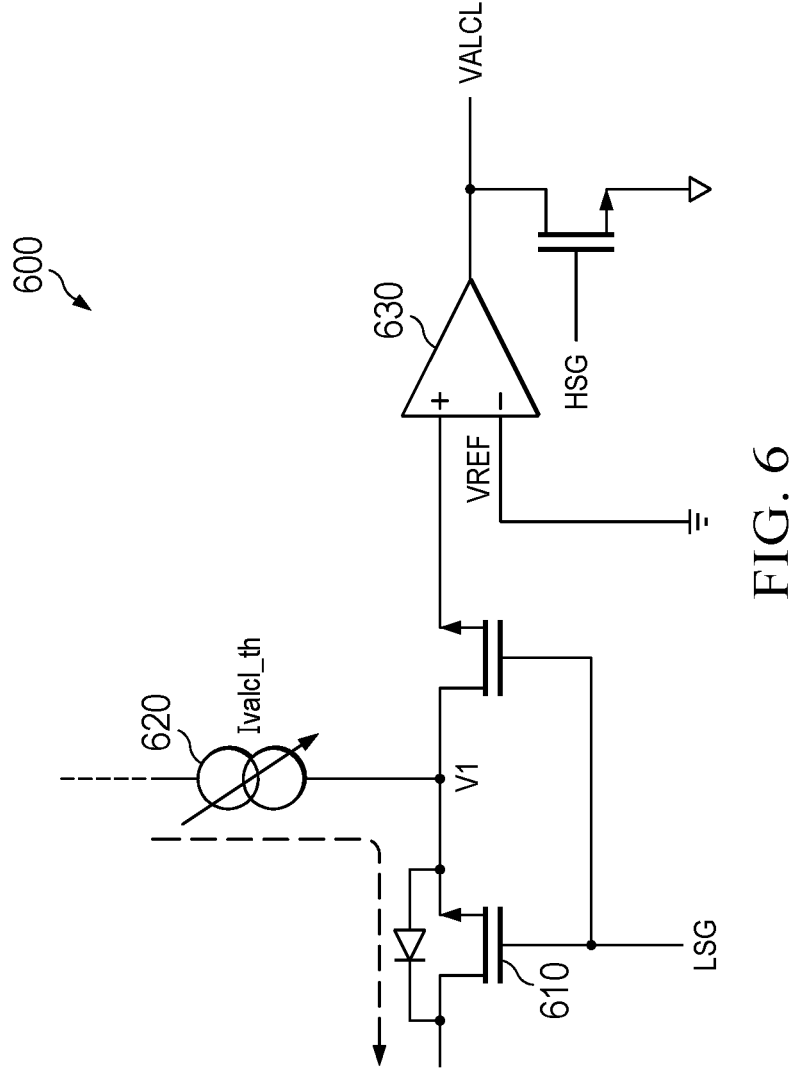
FIG. 6 shows a schematic circuit diagram of a valley current threshold detector circuit according to some embodiments.

FIG. 6 shows a schematic circuit diagram of a valley current threshold detector circuit 600 according to some embodiments. Valley current threshold detector circuit 600 may be used as valley current threshold detector circuit 170 of a converter, such as converter circuit 100. Valley current threshold detector circuit 600 includes replica device 610, valley current reference current generator 620, and comparator 630. Valley current threshold detector circuit 600 may behave similarly or identically to that described above with reference to valley current threshold detector circuit 300 and/or valley current threshold detector circuit 500, where corresponding elements correspondingly function.

In contrast to the corresponding valley current reference current generators 320 and 520 of some embodiments of valley current threshold detector circuits 300 and/or 500, valley current reference current generator 620 may be designed and manufactured to generate a current that varies with one or more operating conditions, such as process, temperature, voltage, current, and other operating conditions. For example, valley current reference current generator 620 may be designed and manufactured to generate a current, i.e., a valley current threshold current, varying with one or more operating conditions so as to compensate or partially compensate for mismatches between the resistance or impedance of replica device 610 and the low side device of the converter, and/or to compensate for mismatches between the a and β factors described above with reference to FIG. 3.

In embodiments where valley current reference current generator 620 compensate or partially compensate for mismatches between the resistance or impedance of the replica device 610 and the low side device of the converter, the voltage drop across the replica device 610 better matches the voltage drop across the low side device over various process, temperature, voltage, current, and other operating conditions than when non-compensating current sources are used.

In some embodiments, valley current reference current generator 320 or 520 may have the compensating attributes discussed with reference to valley current reference current generator 620 valley current reference current generator 620.

Examples of the present invention are summarized here. Other examples can also be understood from the entirety of the specification and the claims filed herein.

Example 1. One embodiment is a DC/DC converter including a low side and a high side. The converter includes a first switching device being part of the low side, a low side current generator configured to generate a low side current flowing in the first switching device, a second switching device, a compensation resistor coupled in series to the second switching device, a valley current reference current generator configured to generate a valley current threshold current ($I_{valcl_{th}}$) flowing in the second switching device and in the compensation resistor for obtaining a first voltage value, and a comparator configured to compare the first voltage value and a reference voltage for generating an error signal as a function of the comparison, the error signal controlling a conductivity of the first switching device of the low side.

Example 2 The DC/DC converter of example 1, where the first switching device includes a first channel, where the second switching device includes a second channel, and where the compensation resistor is designed to have a value based on a respective designed resistance value of the first and second switching devices, a fraction of a designed current that flows in the first channel, or a fraction of the designed valley current threshold current flowing in the second channel.

Example 3. The DC/DC converter of examples 1 or 2, where the first switching device includes a first channel, where the second switching device includes a second channel, and where a resistance value $R_1$ of the compensation resistor is defined by $$R_1 \approx \alpha \cdot \frac{R'_{ds,LS}}{w_{sd2}} - \beta \cdot \frac{R'_{ds,sd2}}{w_{sd2}},$$

where $\alpha$ is a percentage of current flowing through the first switching device which is flowing through the first channel, where $R'_{ds,LS}$ is a drain to source resistance of the first switching device, where $w_{sd2}$ is a width of the second switching device, where $\beta$ is a percentage of current flowing through the second switching device which is flowing through the second channel, and where $R'_{ds,sd2}$ is a drain to source resistance of the second switching device.

Example 4. The DC/DC converter of anyone of examples 1-3, where a resistance value of the compensation resistor monotonically increases with increasing temperature of the compensation resistor.

Example 5. The DC/DC converter of anyone of examples 1-4, where a resistance value of the compensation resistor is between at least one of 30Ω and 100Ω, 50Ω and 90Ω, and 60Ω and 80Ω, for T<80° C. and is between at least one of 60Ω and 200Ω, 60Ω and 150Ω, and 70Ω and 140Ω for T>80° C.

Example 6. The DC/DC converter of anyone of examples 1-5, where a resistance value of the compensation resistor and a resistance value of at least one of the first and second switching devices are temperature dependent with substantially a same resistance divided by temperature slope for T<80° C.

Example 7. The DC/DC converter of anyone of examples 1-6, where a series resistance of the second switching device and the compensation resistor differs from one divided by a resistance of the first switching device by less than 5%.

Example 8. The DC/DC converter of example 7, where the first switching device includes a first transistor with a first gate configured to receive a first gate voltage, where the second switching device includes a second transistor with a second gate configured to receive a second gate voltage, and where the first gate voltage is equal to the second gate voltage.

Example 9. The DC/DC converter of anyone of examples 1-8, where a series resistance of the second switching device and the compensation resistor differs from a resistance of the first switching device by less than 5% while operating the DC/DC converter in a temperature of 80° C.

Example 10. The DC/DC converter of anyone of examples 1-9, where the compensation resistor includes a third switching device.

Example 11. The DC/DC converter of example 10, where the first switching device includes a first transistor with a first gate configured to receive a first gate voltage, where the second switching device includes a second transistor with a second gate configured to receive a second gate voltage, where the third switching device includes a third transistor with a third gate configured to receive a third gate voltage, and where the first gate voltage, the second gate voltage, and the third gate voltage are equal.

Example 12. Another embodiment is a converter circuit. The converter circuit includes a high side device coupled to a switch node and configured to selectively electrically couple the switch node to a high input voltage node according to a high side control signal, a low side device coupled to the switch node and configured to selectively electrically couple the switch node to a low input voltage node according to a low side control signal, an inductor coupled between the switch node and an output node of the converter circuit, a first switch and a compensation resistor coupled in series with the first switch, and a comparator configured to compare a reference voltage with a voltage equal to a sum of a voltage at the switch node and a voltage drop across the first switch and the compensation resistor, the comparator being configured to generate a valley current threshold signal based in part on an output of the comparator, the valley current threshold signal indicating that a valley current provided to the inductor falls below a threshold current limit. The converter circuit also includes a controller configured to generate, based in part on the valley current threshold signal, the high side control signal and the low side control signal.

Example 13. The converter circuit of example 12, where a resistance of the first switch and compensation resistor differs from one divided by a resistance of the low side device by less than 5%.

Example 14. The converter circuit of anyone of examples 12-13, where the first switch includes a first transistor with a first gate configured to receive a first gate voltage, where the low side device includes a second transistor with a second gate configured to receive a second gate voltage, and where the first gate voltage is equal to the second gate voltage.

Example 15. The converter circuit of anyone of examples 12-14, where the compensation resistor includes a second switch.

Example 16. The converter circuit of example 15, where the first switch includes a first gate configured to receive a first gate voltage equal to a gate voltage of the low side device, and where the second switch includes a second gate configured to receive a second gate voltage equal to the gate voltage of the low side device.

Example 17. The converter circuit of anyone of examples 12-16, where the first switch and the compensation resistor has a first voltage drop, where the low side device has a second voltage drop, and where the first voltage drop is within 5% of the second voltage drop.

Example 18. Another embodiment is a method of controlling a DC/DC converter. The method includes generating a valley current threshold current to flow in a series connection including a first switching device and a compensation resistor, generating a first voltage value based on the valley current threshold current and a series resistance of the first switching device and the compensation resistor, with a comparator, comparing the first voltage value and a reference voltage to generate an error signal based on the comparison, and controlling a conductivity of a low side switching device of the DC/DC converter based in part on the error signal.

Example 19. The method of example 18, where the first switching device includes a first transistor with a first gate configured to receive a first gate voltage, where the low side switching device includes a second transistor with a second gate configured to receive a second gate voltage, and where the first gate voltage is equal to the second gate voltage.

Example 20. The method of example 19, where the compensation resistor includes a third transistor with a third gate configured to receive a third gate voltage, and where the third gate voltage is equal to the first and second gate voltages.

While this invention has been described with reference to illustrative implementations, this description is not intended to be construed in a limiting sense. Various modifications and combinations of the illustrative implementations, as well as other implementations of the invention, will be apparent to persons skilled in the art upon reference to the description. It is therefore intended that the appended claims encompass any such modifications or implementations.

What is claimed is:

1. A DC/DC converter comprising a low side and a high side, the converter comprising:

a first switching device being part of the low side, the first switching device comprising a first resistance and first channel;

a low side current generator configured to generate a low side current flowing in the first switching device;

a second switching device, the second switching device comprising a second resistance and a second channel;

a compensation resistor coupled in series to the second switching device;

a valley current reference current generator configured to generate a valley current threshold current flowing in the second switching device and in the compensation resistor for obtaining a first voltage value, the compensation resistor is designed to have a value based on:

the first resistance and second resistance, a fraction of a designed current that flows in the first channel, or a fraction of a designed value of the valley current threshold current that flows in the second channel; and a comparator configured to compare the first voltage value and a reference voltage for generating an error signal as a function of the comparison, the error signal controlling a conductivity of the first switching device of the low side.

2. The DC/DC converter of claim 1, wherein a resistance value $R_1$ of the compensation resistor is defined by:

$$R_1 \approx \alpha \cdot \frac{R'_{ds,LS}}{w_{sd2}} - \beta \cdot \frac{R'_{ds,sd2}}{w_{sd2}},$$

where $\alpha$ is a percentage of current flowing through the first switching device which is flowing through the first channel, where $R'_{ds,LS}$ is a drain to source resistance of the first switching device, where $w_{sd2}$ is a width of the second switching device, where $\beta$ is a percentage of current flowing through the second switching device which is flowing through the second channel, and where $R'_{ds,sd2}$ is a drain to source resistance of the second switching device.

3. The DC/DC converter of claim 1, wherein a resistance value of the compensation resistor monotonically increases with increasing temperature of the compensation resistor.

4. The DC/DC converter of claim 1, wherein a resistance value of the compensation resistor is between at least one of: 30Ω and 100Ω, 50Ω and 90Ω, and 60Ω and 80Ω, for T<80° C. and is between at least one of 60Ω and 200Ω, 60Ω and 150Ω, and 70Ω and 140Ω for T>80° C.

5. The DC/DC converter of claim 1, wherein a resistance value of the compensation resistor and a resistance value of at least one of the first and second switching devices are temperature dependent with substantially a same resistance divided by temperature slope for T<80° C.

6. The DC/DC converter of claim 1, wherein a series resistance of the second switching device and the compensation resistor differs from one divided by a resistance of the first switching device by less than 5%.

7. The DC/DC converter of claim 6, wherein the first switching device comprises a first transistor with a first gate configured to receive a first gate voltage, wherein the second switching device comprises a second transistor with a second gate configured to receive a second gate voltage, and wherein the first gate voltage is equal to the second gate voltage.

8. The DC/DC converter of claim 1, wherein a series resistance of the second switching device and the compensation resistor differs from a resistance of the first switching device by less than 5% while operating the DC/DC converter in a temperature of 80° C.

9. The DC/DC converter of claim 1, wherein the compensation resistor comprises a third switching device.

10. The DC/DC converter of claim 1, wherein the first switching device comprises a first transistor with a first gate configured to receive a first gate voltage, wherein the second switching device comprises a second transistor with a second gate configured to receive a second gate voltage, wherein the third switching device comprises a third transistor with a third gate configured to receive a third gate voltage, and wherein the first gate voltage, the second gate voltage, and the third gate voltage are equal.

11. A converter circuit, comprising:

a high side device coupled to a switch node and configured to selectively electrically couple the switch node to a high input voltage node according to a high side control signal;

a low side device coupled to the switch node and configured to selectively electrically couple the switch node to a low input voltage node according to a low side control signal;

an inductor coupled between the switch node and an output node of the converter circuit;

a first switch and a compensation resistor coupled in series with the first switch;

a comparator configured to compare a reference voltage with a voltage equal to a sum of a voltage at the switch node and a voltage drop across the first switch and the compensation resistor, the comparator being configured to generate a valley current threshold signal based in part on an output of the comparator, the valley current threshold signal indicating that a valley current provided to the inductor falls below a threshold current limit; and a controller configured to generate, based in part on the valley current threshold signal, the high side control signal and the low side control signal.

12. The converter circuit of claim 11, wherein a resistance of the first switch and compensation resistor differs from one divided by a resistance of the low side device by less than 5%.

13. The converter circuit of claim 11, wherein the first switch comprises a first transistor with a first gate configured to receive a first gate voltage, wherein the low side device comprises a second transistor with a second gate configured to receive a second gate voltage, and wherein the first gate voltage is equal to the second gate voltage.

14. The converter circuit of claim 11, wherein the compensation resistor comprises a second switch.

15. The converter circuit of claim 14, wherein the first switch comprises a first gate configured to receive a first gate voltage equal to a gate voltage of the low side device, and wherein the second switch comprises a second gate configured to receive a second gate voltage equal to the gate voltage of the low side device.

16. The converter circuit of claim 11, wherein the first switch and the compensation resistor has a first voltage drop, wherein the low side device has a second voltage drop, and wherein the first voltage drop is within 5% of the second voltage drop.

17. A method of controlling a DC/DC converter, the method comprising:

generating a valley current threshold current to flow in a series connection comprising a first switching device and a compensation resistor, the first switching device comprising a first transistor with a first gate configured to receive a first gate voltage;

generating a first voltage value based on the valley current threshold current and a series resistance of the first switching device and the compensation resistor;

with a comparator, comparing the first voltage value and a reference voltage to generate an error signal based on the comparison; and controlling a conductivity of a low side switching device of the DC/DC converter based in part on the error signal, wherein the low side switching device comprises a second transistor with a second gate configured to receive a second gate voltage, and wherein the first gate voltage is equal to the second gate voltage.

18. The method of claim 17, wherein the compensation resistor comprises a third transistor with a third gate configured to receive a third gate voltage, and wherein the third gate voltage is equal to the first and second gate voltages.

19. The method of claim 17, wherein a resistance value of the compensation resistor monotonically increases with increasing temperature of the compensation resistor.

20. The method of claim 17, wherein a resistance value of the compensation resistor is between at least one of: 30Ω and 100Ω, 50Ω and 90Ω, and 60Ω and 80Ω, for T<80° C. and is between at least one of 60Ω and 200Ω, 60Ω and 150Ω, and 70Ω and 14Ω for T>80° C.

* * * * *